United States Patent
Sung et al.

(10) Patent No.: US 7,142,829 B2
(45) Date of Patent: Nov. 28, 2006

(54) DUAL ANTENNA DIVERSITY TRANSMITTER AND SYSTEM WITH IMPROVED POWER AMPLIFIER EFFICIENCY

(75) Inventors: Jin Bong Sung, Daejeon-Shi (KR); Sung Weon Kang, Daejeon-Shi (KR); Chang Hee Hyoung, Daejeon-Shi (KR); Jung Hwan Hwang, Daejeon-Shi (KR); Yun Tae Kim, Daejeon-Shi (KR)

(73) Assignee: Electronics and Telecommunications Research Institute, Daejeon-Shi (KR)

( * ) Notice: Subject to any disclaimer, the term of this patent is extended or adjusted under 35 U.S.C. 154(b) by 417 days.

(21) Appl. No.: 10/836,382

(22) Filed: May 3, 2004

(65) Prior Publication Data

US 2005/0143024 A1    Jun. 30, 2005

(30) Foreign Application Priority Data

Dec. 26, 2003    (KR)    ...................... 10-2003-0097047

(51) Int. Cl.
*H03C 7/02*    (2006.01)
*H04B 1/02*    (2006.01)
*H04B 7/02*    (2006.01)

(52) U.S. Cl. .................... 455/101; 455/103; 455/277.1; 375/299; 375/347

(58) Field of Classification Search ................ 455/101, 455/103, 127.1, 127.2, 127.3, 129, 272, 277.1, 455/277.2; 375/299, 347
See application file for complete search history.

(56) References Cited

U.S. PATENT DOCUMENTS 4,057,758 A * 11/1977 Hattori et al. .............. 375/267
5,661,434 A    8/1997 Brozovich et al.
5,715,525 A * 2/1998 Tarusawa et al. ........... 455/101
5,724,005 A    3/1998 Chen et al.
6,208,202 B1   3/2001 Kaufman et al.
6,445,247 B1   9/2002 Walker
6,473,600 B1 * 10/2002 Dvorkin ..................... 455/129
6,591,087 B1 * 7/2003 Oda ............................ 455/78
2004/0043731 A1 * 3/2004 Xiong ........................ 455/130
2005/0079825 A1 * 4/2005 Omori et al. ............. 455/67.11

FOREIGN PATENT DOCUMENTS

| JP | 11-274948 | 10/1999 |
|---|---|---|
| KR | 1997-31237 | 6/1997 |
| KR | 2000-46166 | 7/2000 |
| KR | 2002-83735 | 11/2002 |
| KR | 2003-05783 | 1/2003 |
| KR | 2003-16449 | 3/2003 |

* cited by examiner

*Primary Examiner*—Nguyen T. Vo
(74) *Attorney, Agent, or Firm*—Mayer, Brown, Rowe & Maw LLP

(57) ABSTRACT

Provided is a dual antenna diversity transmitter and system having improved power amplifier efficiency, and further comprising switches in the dual antenna diversity transmitter and system, to minimize a DC input power consumed by the power amplifier depending on the required transmitting output power and operate efficiently the power amplifier, whereby signal linearity can be maintained and the power amplifier can be efficiently operated in a more simplified manner, as compared to the conventional high efficiency power amplifier.

20 Claims, 11 Drawing Sheets

DUAL ANTENNA DIVERSITY TRANSMITTER AND SYSTEM WITH IMPROVED POWER AMPLIFIER EFFICIENCY

BACKGROUND

1. Field of the Invention

The present invention relates to a dual antenna diversity transmitter and system and, more particularly, to a dual antenna diversity transmitter and system with high power amplifier efficiency.

2. Discussion of Related Art

A dual antenna diversity method is intended to overcome a fading phenomenon due to a multi-path phenomenon of a radio signal in a wireless propagation environment. It forms two radio signal paths un-correlated with each other on space or on antenna polarization through two antennas, and then receives a signal through the minimum fading path between them. Many wireless communication systems widely used in an indoor environment where the fading phenomenon is serious, such as a wireless LAN, use such a dual antenna diversity system.

Hereinafter, a conventional dual antenna diversity system will now be described with reference to FIGS. 1 to 3.

FIG. 1 is a block diagram illustrating a configuration of the conventional dual antenna diversity system, comprising two antennas 101 and 102 for forming radio signal paths un-correlated with each other on space or on antenna polarization with the identical antenna characteristics, diversity switches 103 and 104 for switching signals received by the two antennas, a power amplifier 105 for amplifying the power of a transmitting signal, two filters 106 and 107 for removing an unnecessary signal, transmitter/receiver circuits 108 and 109 for processing transmitting/receiving signals, and a base-band process circuit 110 for processing a base-band signal. The filters 106 and 107 may not be included in the system, and in this case, the transmitter/receiver circuits 108 and 109 may serve as filters 106 and 107. When transmitting the signal, the second switch 104 is switched to the first path to transfer the signal amplified at the power amplifier 105 to the second antenna 102. When receiving the signal, the second switch 104 is switched to the second path to selectively receive the minimum fading signal among the signals received by the first antenna 101 and the second antenna 102 through the first switch 103.

The power amplifier 105, which amplifies the inputted signal to a signal having extremely large power, is located between the transmitting antenna 102 and the transmitter circuit 108 in the wireless communication system, and generally has a structure that a number of transistors are combined in parallel to raise the output. As an indicator representing the performance of the power amplifier 105, the following Equation 1 defines power added efficiency (PAE) referred to as a ratio of the amplification power of the power amplifier 105 to the DC power that is inputted to the power amplifier 105 in the form of bias current and voltage.

$$PAE = (\text{output power} - \text{input power})/\text{DC input power} \times 100 \qquad [\text{equation 1}]$$

As illustrated above, the power amplifier 105 is composed of a number of transistors, whereby it has a problem that a bias current larger than that of a normal amplifier composed of a few transistors is always consumed. Moreover, most systems are required to maintain constant linearity, so that a bias point of the power amplifier is designed with Class AB. Accordingly, there is a problem that the inputted bias current increases with an increase of the output power of the power amplifier.

FIG. 2 is a diagram illustrating power added efficiency (PAE) according to an output power of the power amplifier. Referring to FIG. 2, the power added efficiency gradually increases as the output power increases, and the remaining range other than the maximum output power range shows extremely low power added efficiency. However, a wireless communication system is not always required to output the maximum power, but to output a suitable power level according to environment factors in which the system is operable, such as a distance between the transmitter and the receiver.

FIG. 3 is a diagram illustrating a distribution profile of occurrence probability depending on output power of a transmitting system of a cellular-band mobile communication terminal. FIG. 3 shows that the output power of the transmitting system has a very high probability of occurrence in a range of about −10 to 5 dBm, while it has a very low probability of occurrence in a range of 25 dBm or more being the maximum output power. Further, the probability of occurrence depending on the output power of the power amplifier consequentially has a similar distribution profile since the signal loss between the power amplifier and the transmitting antenna is low. Meanwhile, even in case of almost all of the wireless communication system including the mobile communication, it has probability distribution of occurrence similar to that. As such, the maximum probability of occurrence of the power amplifier is distributed in the intermediate output power range indicative of relatively low power added efficiency rather than the maximum output power range indicative of the maximum power added efficiency, thereby having a problem that the power amplifier is inefficiently operated during most duration of the use period of the power amplifier.

Hereinafter, a method of increasing the efficiency of the power amplifier according to the prior art will now be described with reference to FIGS. 4 and 5.

FIG. 4 is a block diagram illustrating a configuration of a transmitting unit employing a DC bias point control, which is one of methods for improving the power amplifier efficiency according to the prior art. In FIG. 4, the transmitting unit comprises a transmitter circuit 108, a power amplifier 105, a filter 107, an antenna 102, a power detector 121 for detecting the output power, and a bias point controller 122. Here, after the output power of the power amplifier 105 is detected by the power detector 121, a DC bias voltage or a DC bias current inputted to the power amplifier 105 is adjusted depending on the output power to control the bias point of the power amplifier 105. In other words, the amount of DC input power can be decreased in the range other than the maximum output power range of the power amplifier 105, by controlling an input amount of the DC bias voltage or the DC bias current inputted to the power amplifier 105 through the bias point controller 122 in proportion with a required output power, so that the power added efficiency of the power amplifier would be improved. The associated description has been provided in "Young-Kai Chen, Jenshan Lin, Linear Power Amplifier With Automatic Gate/Base Bias Control for Optimum Efficiency, U.S. Pat. No. 5,724, 005, Mar. 3, 1998."

However, the aforementioned method has a problem that the bias point of the power amplifier changes, and thus, the output matching condition is changed, resulting in aggravating the linearity of the power amplifier 105. Therefore, there should be a restriction to the amount of DC input power that is decreased by the control of the bias point controller, in order to meet the linearity specification required in the system. Thus, it has a problem that a degree of improving the power added efficiency is very little.

FIG. 5 is a block diagram illustrating a configuration of a power amplifier employing a second stage by-pass, which is one of methods for improving the power amplifier efficiency according to the prior art. In FIG. 5, the power amplifier comprises a first stage 124, a second stage 128, an input matching circuit 123 for forming a matching condition of the signal, an output matching circuit 129, an intermediate matching circuit 127, a bypass matching circuit 125, single-pole single-throw (SPST) switches 126, 130, and 132, and a switch controller 131. The power amplifier determines whether or not the second stage 128 needs to be bypassed according to the output power of the required power amplifier and then switches the signal. That is, in case where the high output power is required, the output signal of the first stage 124 is amplified to a signal through the first path with a higher power than the second stage 128, while closing switches 126 and 130 on the first path and opening switch 132 on the second path. Further, in case where the output power not so high as can be amplified only with the first stage 124 is required, a signal bypassing the second stage 128 through the second path is outputted by opening the switches 126 and 130 on the first path and closing the switch 132 on the second path. At this time, the DC bias power inputted at the second stage 128 is minimized to increase the power added efficiency of the power amplifier since the second stage 128 does not serve as an amplifier. The associated description has been provided in "R. Steven Brozovich, Wayne Kennan, High Efficiency Multiple Power Level Amplifier Circuit, U.S. Pat. No. 5,661,434, Aug. 26, 1998".

However, in case that the output signal of the first stage 124 is switched to the second path, the output impedance condition of the first stage 124 and the input impedance condition of the filter (not shown) are mismatched each other to cause a reflection phenomenon of the signal. Thus, an additional matching circuit other than the existing matching circuit is required in order to block this reflection phenomenon. Further, the single-pole single-throw switches 126, 130, and 132 should be installed at the output of the first stage 124 and the second stage 128 and on the by-pass path, in order to make isolation between the first path and the second path. For this reason, the second stage by-pass has a problem that the structural configuration of the power amplifier becomes complicated. In addition, the switch and the bypass path should be configured on the signal path between the first stage 124 and the second stage 128 within the existing power amplifier circuit, so that it has a problem that this structure should be considered from when designing the power amplifier, and that it cannot be applied to the structure of the existing power amplifier.

SUMMARY OF THE INVENTION

Therefore, the present invention is directed to a dual antenna diversity transmitter and system, which can minimize the power consumption of a power amplifier, maintain the signal linearity, and be simply configured, in case that high output power is not required.

One aspect of the present invention is to provide a dual antenna diversity transmitter comprising: a base-band process circuit processing a base-band signal to output a base-band transmitting signal; a transmitter circuit converting the base-band transmitting signal to a radio frequency transmitting signal; a first bypass switch opened or closed by means of a switch control signal, and receiving the radio frequency transmitting signal; a first antenna receiving an output of the first bypass switch; a second bypass switch opened or closed by means of the switch control switch, and receiving the radio frequency transmitting signal; a power amplifier amplifying and outputting an output of the second switch; and a second antenna that receives an output of the power amplifier.

Another aspect of the present invention is to provide a dual antenna diversity system comprising a first antenna, a second antenna, a first diversity switch, a second diversity switch, a power amplifier, a first filter, a second filter, a transmitter circuit, a receiver circuit, a base-band process circuit, a first bypass switch and a second bypass switch; wherein the transmitter circuit converts a base-band transmitting signal outputted from the base-band process circuit into a radio frequency transmitting signal; wherein the first bypass switch is opened or closed depending on a switch control signal, and when closed, outputs the radio frequency transmitting signal to the first filter; wherein the second bypass switch is opened or closed depending on the switch control signals and when closed, outputs the radio frequency transmitting signal to the power amplifier, wherein the power amplifier amplifies and outputs an output of the second switch; wherein the receiver circuit converts an inputted radio frequency receiving signal into a base-band receiving signal and outputs the base-band receiving signal to the base-band process circuit; wherein the first diversity switch connects an input of the receiver circuit to any one of the first filter and one terminal of the second diversity switch depending on the switch control signal; wherein the second diversity switch connects the second filter to any one of the output of the power amplifier and one terminal of the first diversity switch depending on the switch control signal; wherein the first antenna is connected to the first filter; and wherein the second antenna is connected to the second filter.

Still another aspect of the present invention is to provide a dual antenna diversity system comprising a first antenna, a second antenna, a diversity switch power amplifier, a transmitter circuit, a receiver circuit, a base-band process circuit, a first bypass switch, a second bypass switch, a first duplex and a second duplex, wherein the transmitter circuit converts a base-band transmitting signal outputted from the base-band process circuit into a radio frequency transmitting signal; wherein the first bypass switch is opened or closed depending on a switch control signal, and when closed, outputs the radio frequency transmitting signal to the first duplex; wherein the second bypass switch is opened or closed depending on the switch control signal, and when closed, outputs the radio frequency transmitting signal to the power amplifier; wherein the power amplifier amplifies and outputs an output the second switch; wherein the receiver circuit converts an inputted radio frequency receiving signal into a base-band receiving signal to output to the base-band process circuit; wherein the diversity switch connects an input of the receiver circuit to the first duplex or the second duplex depending on the switch control signal; wherein the first duplex transfers a signal received from the first antenna to the diversity switch, and transfers a signal inputted from the first bypass switch to the first antenna; and wherein the second duplex transfers a signal received from the second antenna to the diversity switch, and transfers a signal inputted from the power amplifier to the second antenna.

DETAILED DESCRIPTION OF PREFERRED EMBODIMENTS

The preferred embodiment of the present invention will now be described with the accompanying drawings. However, the embodiments of the present invention can be modified in a variety of forms, and should not be interpreted to limit the scope of the present invention to the following embodiments. The embodiments of the present invention are provided to more perfectly describe the present invention to those skilled in the art.

EXAMPLE 1

Figure 6:
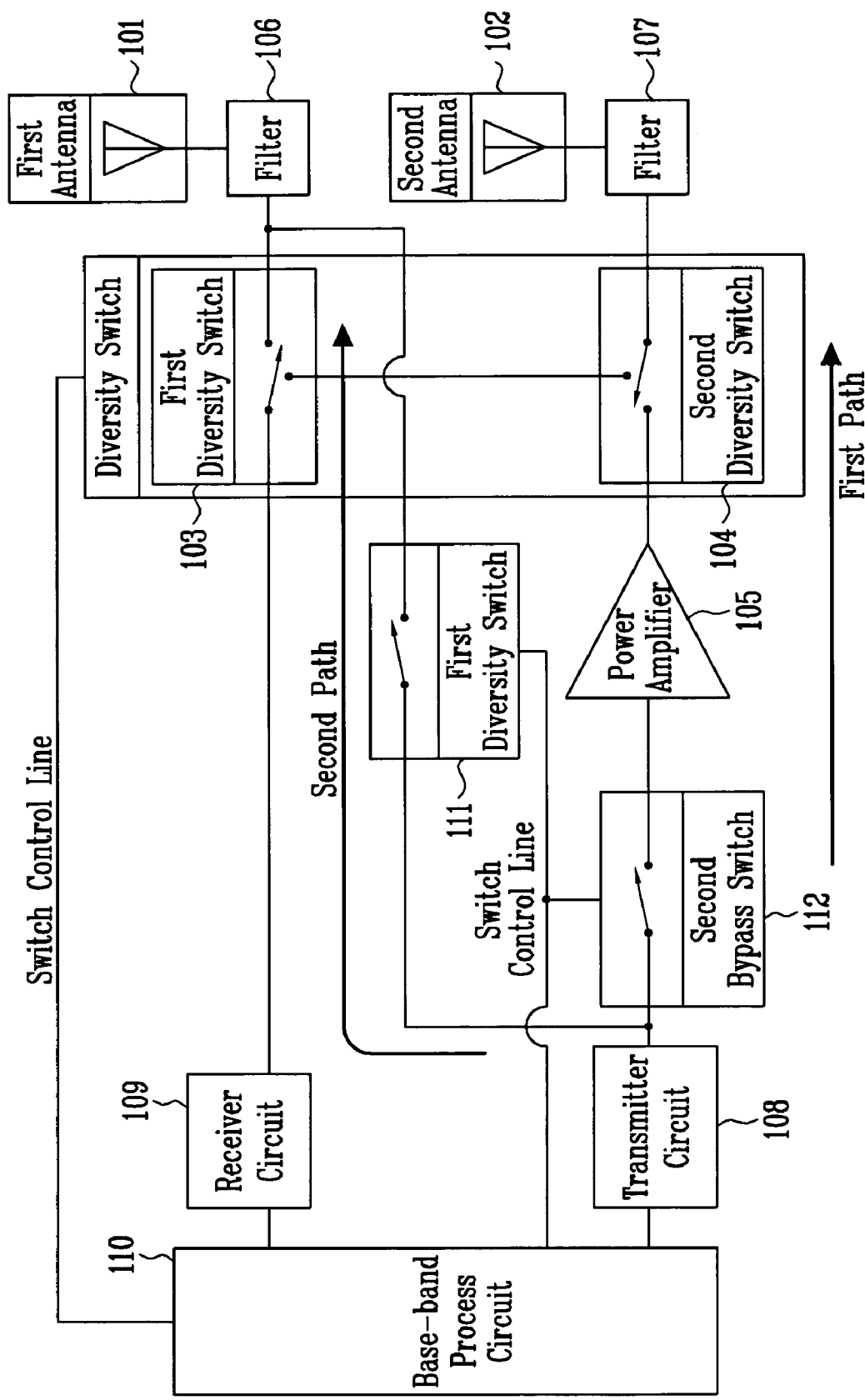
FIG. 6 is a block diagram illustrating a configuration of a dual antenna diversity system according to a first embodiment of the present invention.

FIG. 6 is a block diagram illustrating a configuration of a dual antenna diversity system according to a first embodiment of the present invention.

The dual antenna diversity system in FIG. 6, with the same manner as the prior art, comprises a first antenna 101 and a second antenna 102 for forming radio signal paths uncorrelated with each other on space or on antenna polarization and having the same antenna characteristics; a first diversity switch 103 and a second diversity switch 104 for switching a signal received by the two antennas; a power amplifier 105 for amplifying a transmitting signal power; a first filter 106 and a second filter 107 for removing an unnecessary signal; a transmitter circuit 108 for processing the transmitting signal, i.e., converting the base-band signal to a radio frequency signal; a receiver circuit 109 for processing a receiving signal, i.e., converting the radio frequency signal to the base-band signal; and a base-band process circuit 110 for processing the base-band signal. Additionally, the dual antenna diversity system comprises a first bypass switch 111 and a second bypass switch 112 that are controlled by a base-band process circuit 110.

In the case of receiving the signal, the present dual antenna diversity system selectively receives the less fading signal with the first diversity switch 103 and the second diversity switch 104 among signals each received by the first antenna 101 and the second antenna 102, like the dual antenna diversity system according to the prior art.

In the case of transmitting the signal, the transmitting output power of the dual antenna diversity system is adjusted depending on an environment factor in which the system is operated, such as a distance between the transmitter and the receiver. The probability of occurrence depending on the transmitting output power for the wireless communication system, as illustrated above, has highly distributed in a low transmitting output power range around −10~5 dBm rather than the maximum transmitting output power range of 25 dBm or more. Further, such a signal with low power can be outputted from the transmitter circuit 108 of almost all of the wireless communication system. Therefore, the maximum output power of the transmitter circuit 108 is set as a reference output power, and then, the required transmitting output power is compared with the reference output power to transmit by the following two methods.

First, when the required transmitting output power is larger than the reference output power, the sufficient transmitting output power cannot be obtained with only the transmitter circuit 108, so that the output signal of the transmitter circuit 108 is switched to the first path by opening a first bypass switch 111 and closing a second bypass switch 112 to amplify the output signal to the high power signal through the power amplifier 105. The amplified signal is transmitted to the second antenna 102 by the second diversity switch 104. On the other hand, when the transmitting output power is required less than the reference output power, the sufficient output power can be obtained with only the transmitter circuit 108, so that the output signal of the transmitter circuit 108 is bypassed to the second path by closing the first bypass switch 111 and opening the second bypass switch 112 to transmit the output signal to the first antenna 101. At this time, the power amplifier 105 can be switched to an idle mode since the power amplifier 105 does not serve as an amplifier. Therefore, it is possible to efficiently operate the efficient power amplifier 105 by minimizing the DC input power, which was always consumed in the existing power amplifier structure.

EXAMPLE 2

Figure 7:
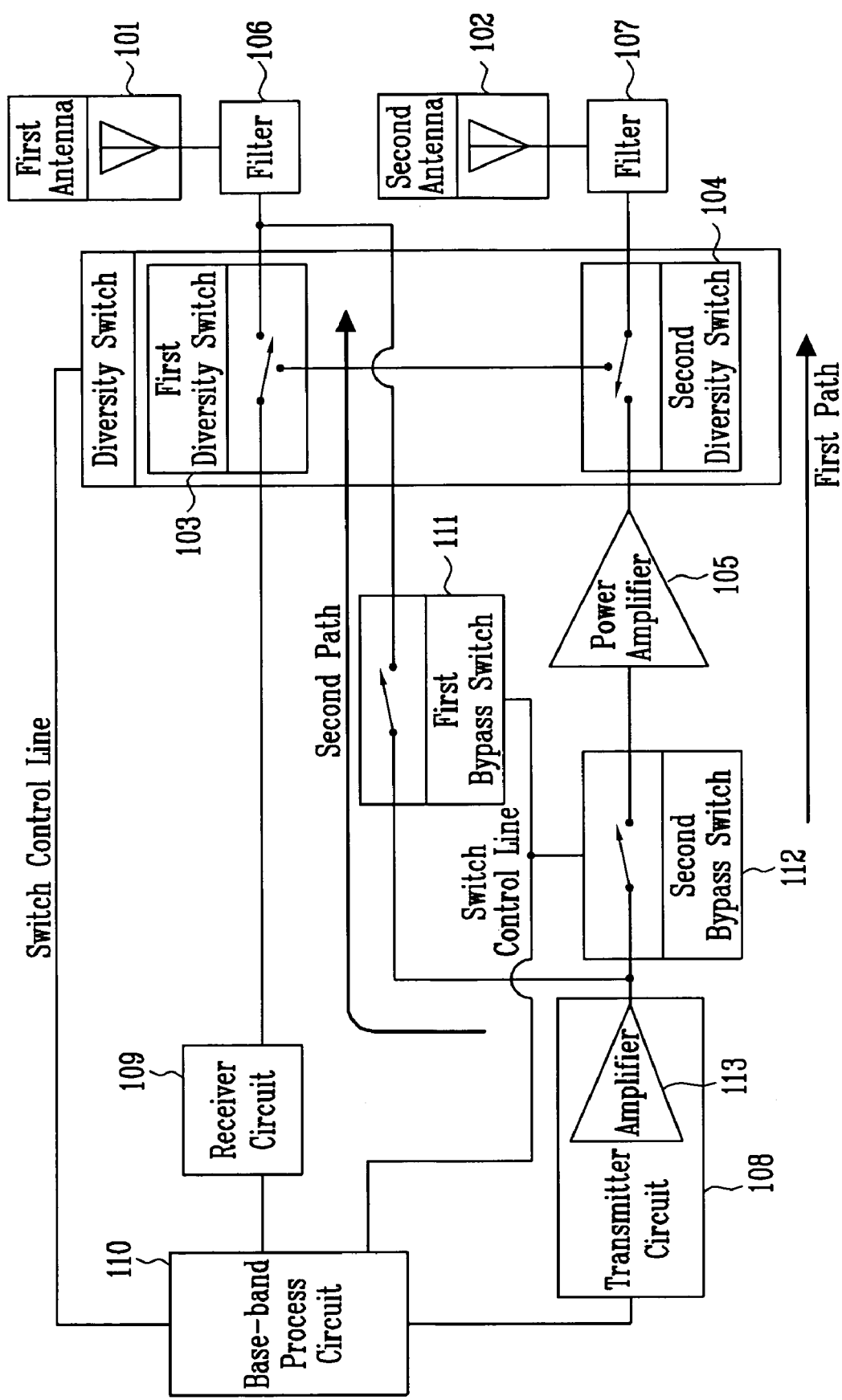
FIG. 7 is a block diagram illustrating a configuration of a dual antenna diversity system according to a second embodiment of the present invention.

FIG. 7 is a block diagram illustrating a configuration of a dual antenna diversity system according to a second embodiment of the present invention.

As shown in FIG. 7, the dual antenna diversity system of the second embodiment of the present invention is different from that of the first embodiment of the present invention in that it further comprises an amplifier 113 within the transmitter circuit 108. In case where the maximum output power of the transmitter circuit 108 is lower than the transmitting output power range where the probability of occurrence is high, the amplifier 113 is intended to make the power amplifier 105 operable with a configuration similar to the first embodiment, by making it possible to output the signal having the transmitting output power in which the probability of occurrence is high, with only the transmitter circuit 108. In this case, the output power of the installed amplifier 113 is significantly lower than that of the power amplifier 105, so that it is difficult to induce interference to an output signal of another circuit in the transmitter circuit 108. Therefore, there is a merit that the amplifier 113 can be installed adjacent to the other circuits within the transmitter circuit 108. Further, the number of transistors used for the amplifier 113 is small to make an area occupied by the amplifier 113 significantly small, which is advantageous to integrate them in the transmitter circuit 108.

EXAMPLE 3

Figure 8:
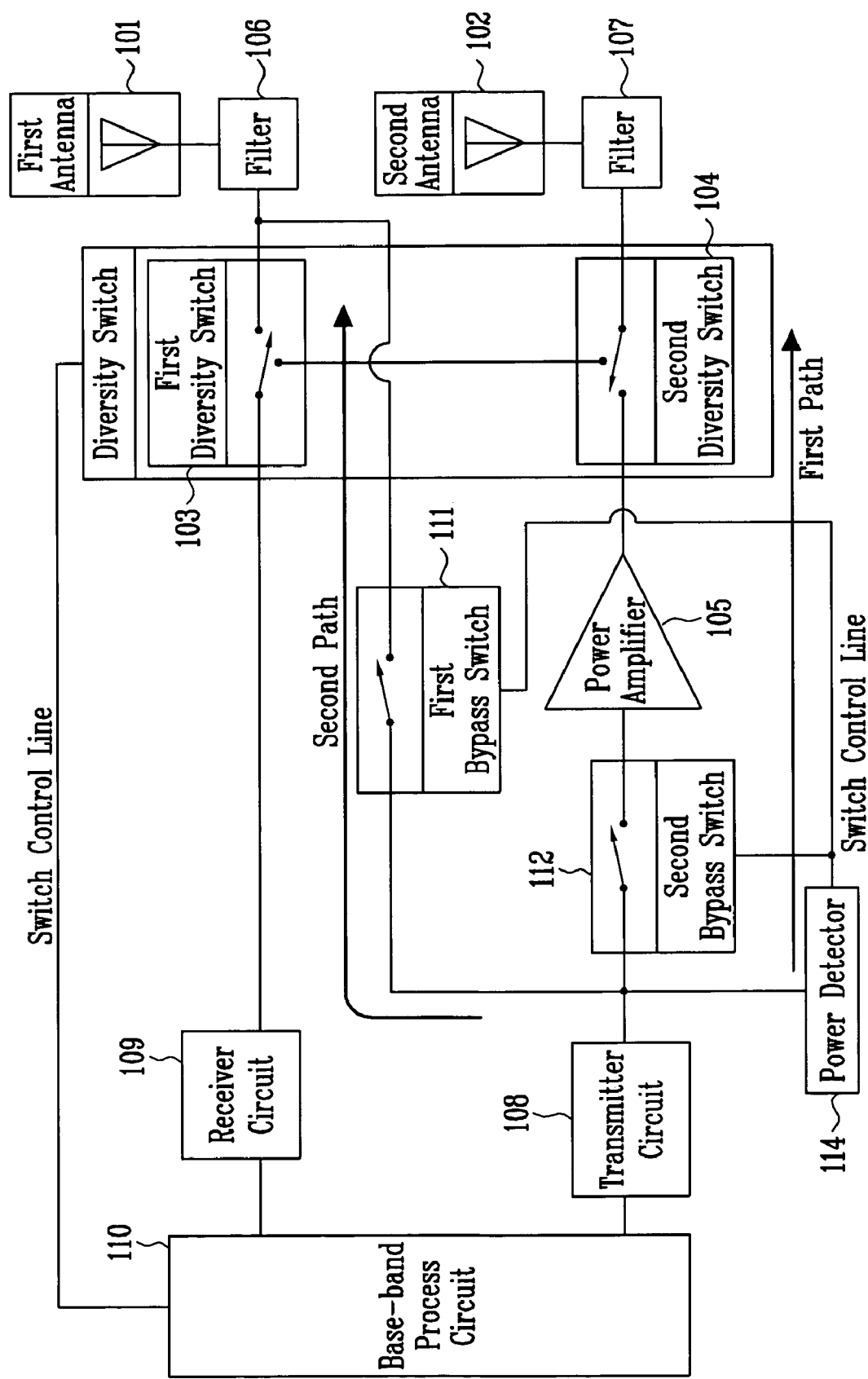
FIG. 8 is a block diagram illustrating a configuration of a dual antenna diversity system according to a third embodiment of the present invention.

FIG. 8 is a block diagram illustrating a configuration of a dual antenna diversity system according to a third embodiment of the present invention.

As shown in FIG. 8, the dual antenna diversity system according to the third embodiment of the present invention adds a power detector 114 in the output of the transmitter circuit 108 to the dual antenna diversity system according to the first embodiment of the present invention. The first bypass switch 111 and the second bypass switch 112 are controlled to be opened or closed, by detecting the output power of the transmitter circuit 108 through the power detector 114 and comparing this with the transmitting output power described in the first embodiment. With this operation, the switch is self-controlled by the power detector 114, contrary to the first embodiment where the first bypass switch 111 and the second bypass switch 112 are controlled by the base-band process circuit 110. Therefore, the efficient operation of the power amplifier 105 like the first embodiment is possible, even in case where a suitable signal for controlling the first bypass switch 111 and the second bypass switch 112 in the base-band process circuit 110 cannot be outputted and the self-controlled switch is required.

In addition, a similar effect can be obtained with the dual antenna diversity system according to the second embodiment of the present invention illustrated in FIG. 7, by adding an amplifier to the transmitter circuit 108 of the dual antenna diversity system according to the third embodiment of the present invention.

EXAMPLE 4

Figure 9:
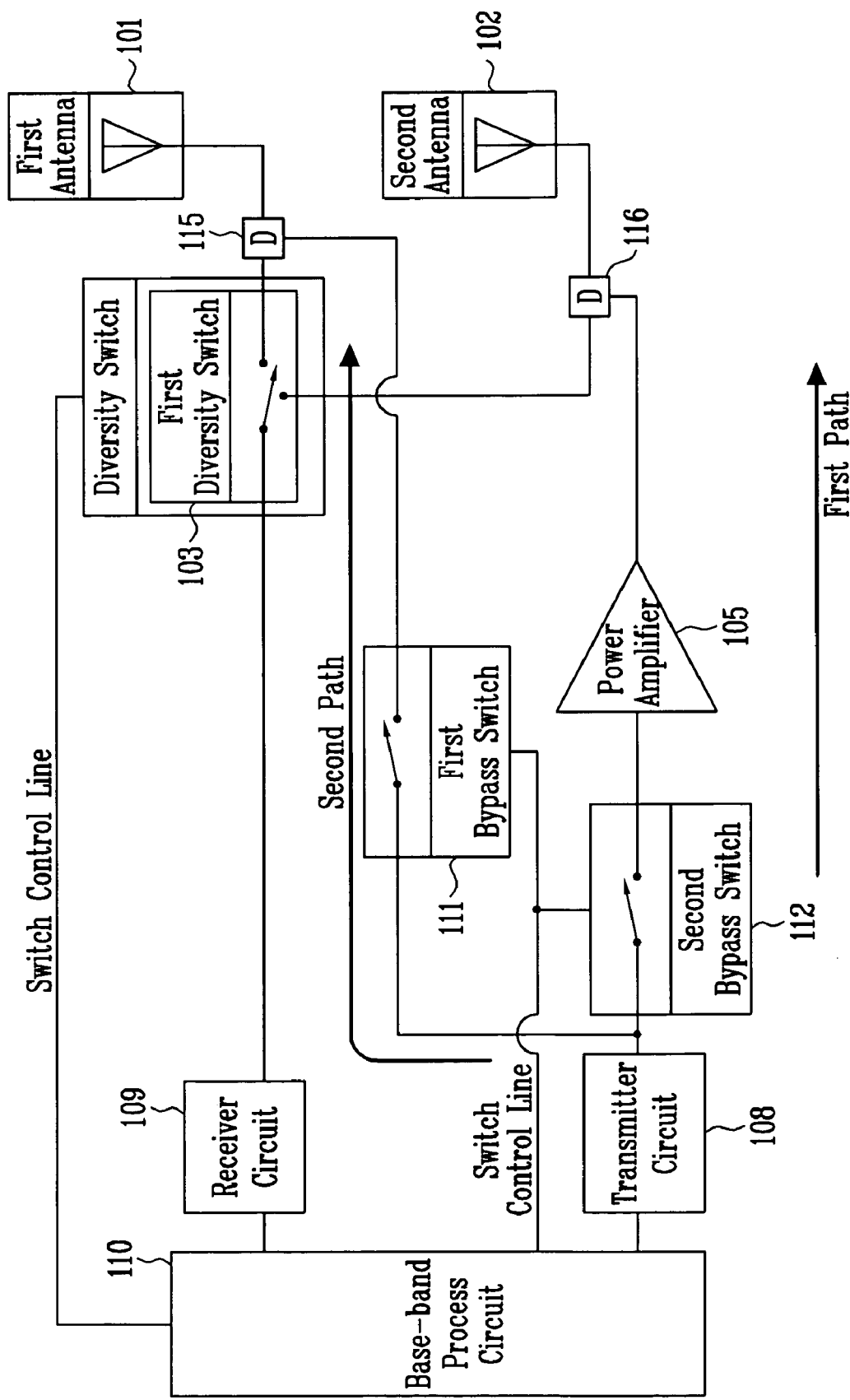
FIG. 9 is a block diagram illustrating a configuration of a dual antenna diversity system according to a fourth embodiment of the present invention.

FIG. 9 is a block diagram illustrating a configuration of a dual antenna diversity system according to a fourth embodiment of the present invention.

As shown in FIG. 9, the dual antenna diversity system according to the fourth embodiment of the present invention is a modified system that full duplex communication is possible in the half duplex dual antenna diversity system according to the first embodiment of the present invention. The dual antenna diversity system of the present embodiment simultaneously transmits the transmitting signal to the antennas 101 and 102 using duplexers 115 and 116, and receives a receiving signal from the antennas 101 and 102, while not comprising the second diversity switch contrary to the first embodiment. Further, it does not comprise a separate filter since the transmitter/receiver circuits 108 and 109 serve as the filter. For convenience of explanation, the description will be omitted since the operation and effect of the present invention is similar to that of the dual antenna diversity system according to the first embodiment of the present invention. Further, methods for employing the amplifier and the power detector described in the second embodiment and the third embodiment of the present invention can also be applied as it is to the dual antenna diversity system according to the fourth embodiment of the present invention.

Figure 10:
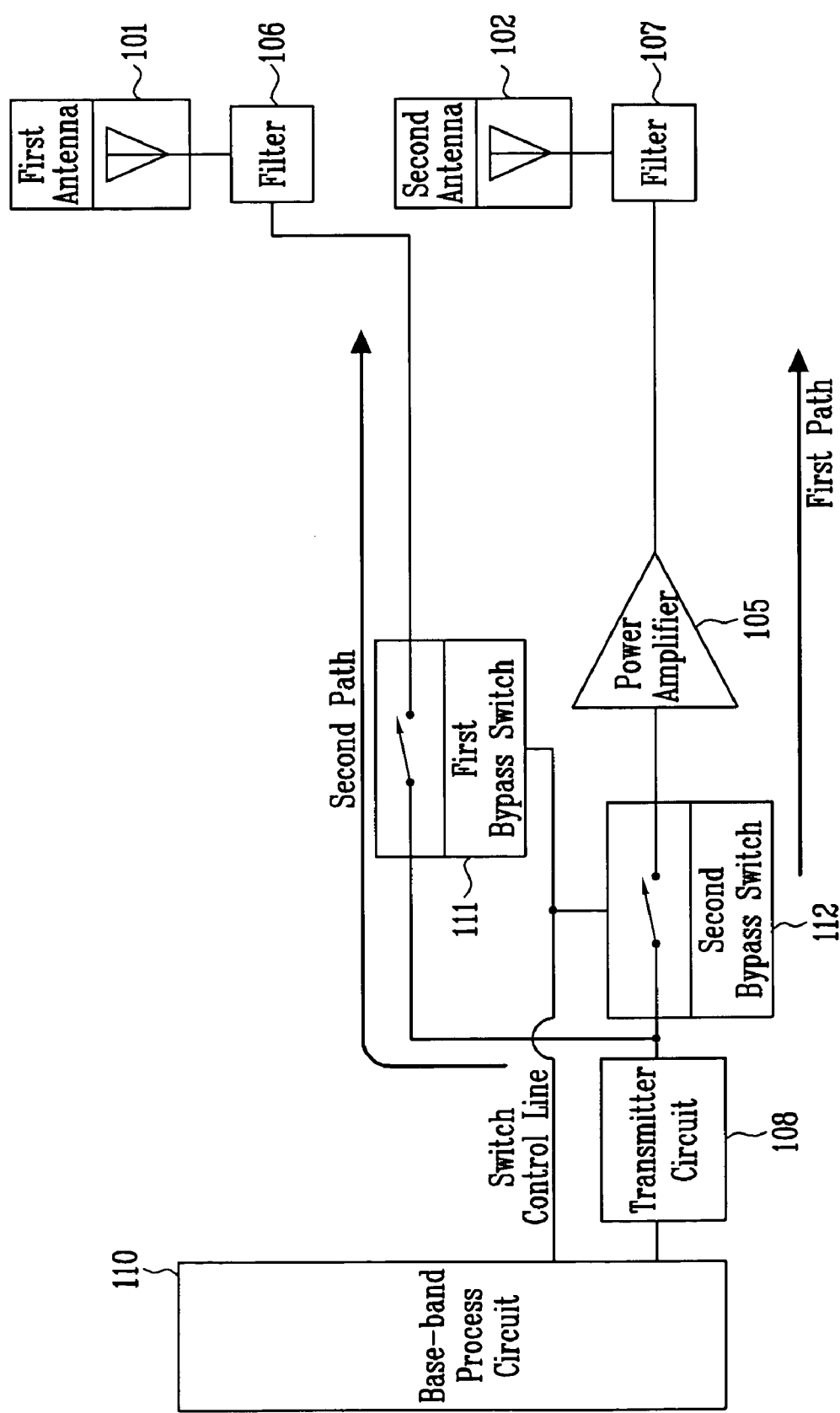
FIG. 10 is a block diagram illustrating a transmitter-only configuration of the dual antenna diversity system according to the first embodiment of the present invention.

FIG. 10 is a block diagram illustrating a configuration of transmitter-only of the dual antenna diversity system according to the first embodiment of the present invention.

As shown in FIG. 10, the dual antenna diversity transmitter according to the first embodiment of the present invention comprises the first antenna 101 and the second antenna 102, the power amplifier 105, the first filter 106 and the second filter 107, the transmitter circuit 108, the base-band process circuit 110, and the first bypass switch 111 and the second bypass switch 112, wherein the output of the first and second bypass switches are respectively connected to the first and second filters 106 and 107. For convenience of explanation, the description will be omitted since the operation and effect of this transmitter is similar to the dual antenna diversity system according to the first embodiment of the present invention. Further, methods for employing the amplifier and the power detector described in the second and third embodiments can also be applied to this transmitter without any change.

Figure 11:
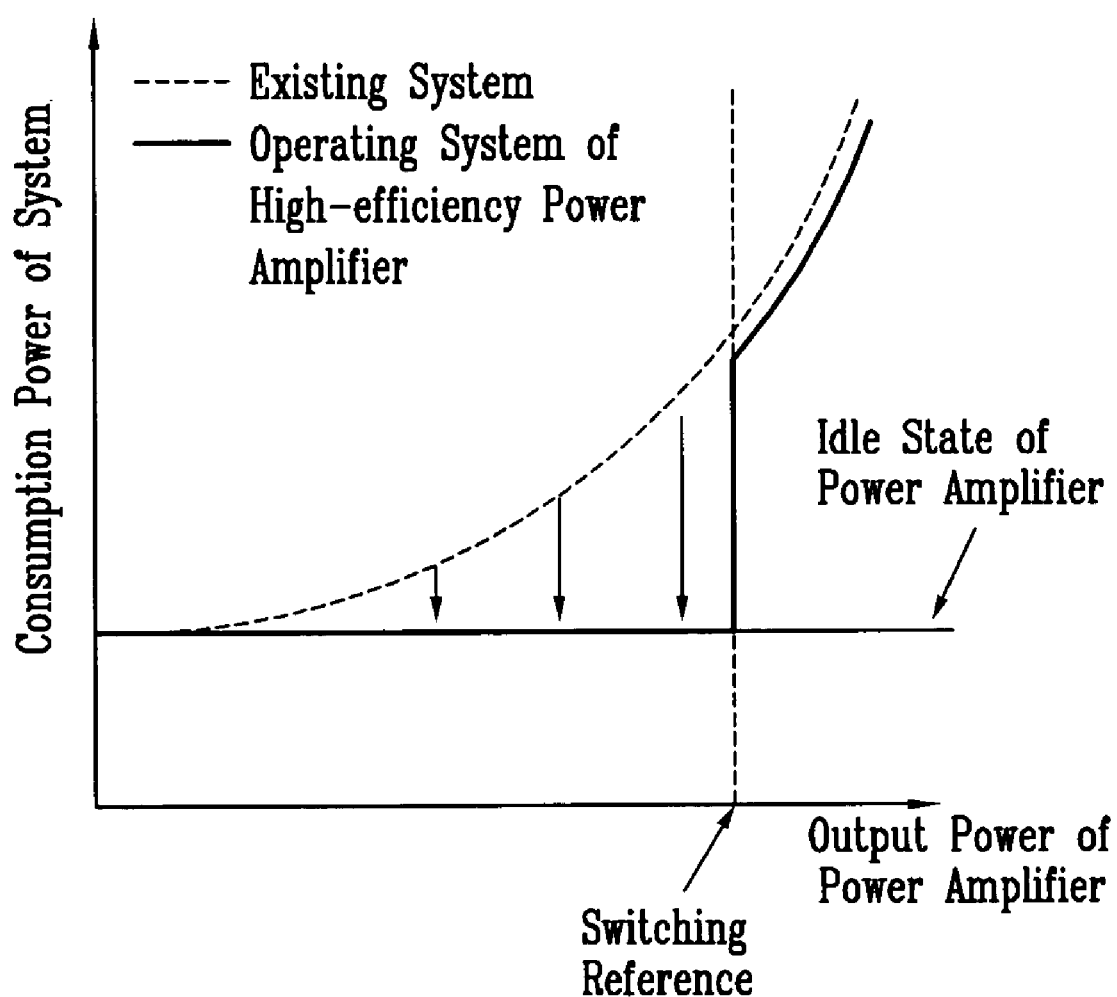
FIG. 11 is a diagram for comparing the dual antenna diversity system of the prior art with that of the present invention, for the power consumption of the overall system depending on the transmitting output power.

FIG. 11 is a diagram for comparing the dual antenna diversity system of the prior art with that of the present invention, for the power consumption of the overall system depending on the transmitting output power. In the case of the prior art system, the power consumption of the overall system increases since the power consumption of the power amplifier 105, which is designed as AB class, increases with an increase of the transmitting output power. While the present system has the same amount of power consumption as the prior art in the range where the transmitting output power is larger than the reference output power that becomes a switching reference of the first bypass switch 111 and the second bypass switch 112, the power consumption of the power amplifier 105 becomes minimized in the range where the transmitting output power is smaller than the reference output power. As a result, there is a merit that the power consumption of the overall system is decreased.

Figure 1:
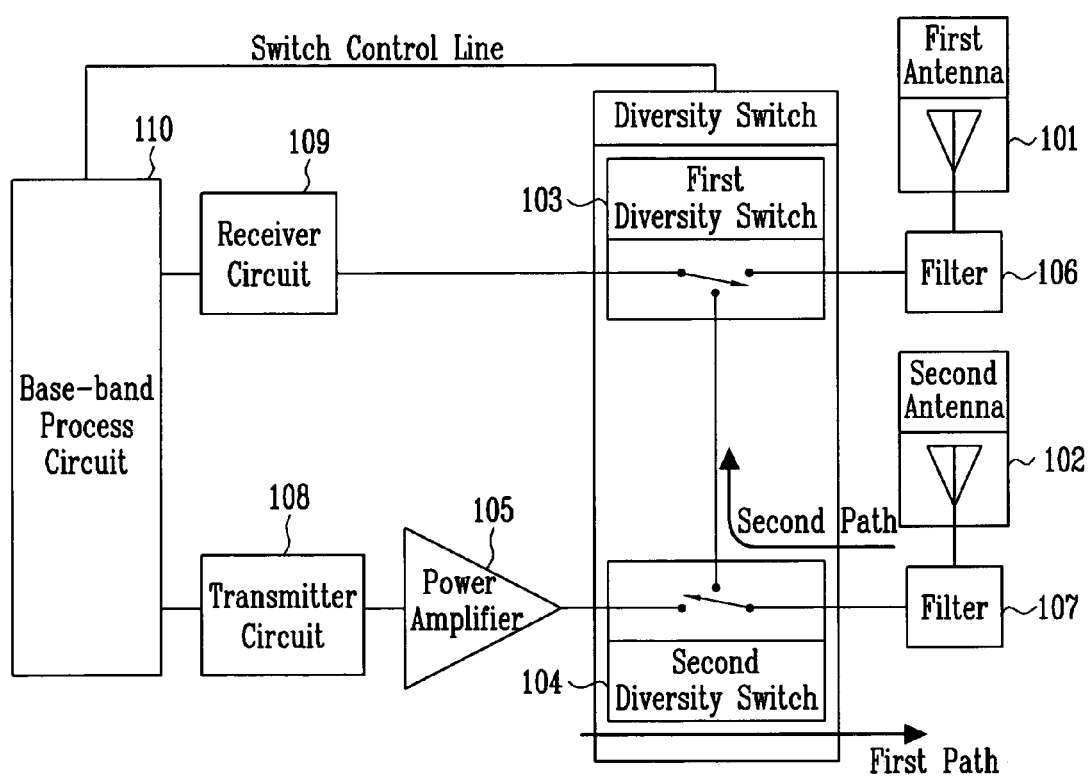
FIG. 1 is a block diagram illustrating a configuration of a dual antenna diversity system according to the prior art.
Figure 2:
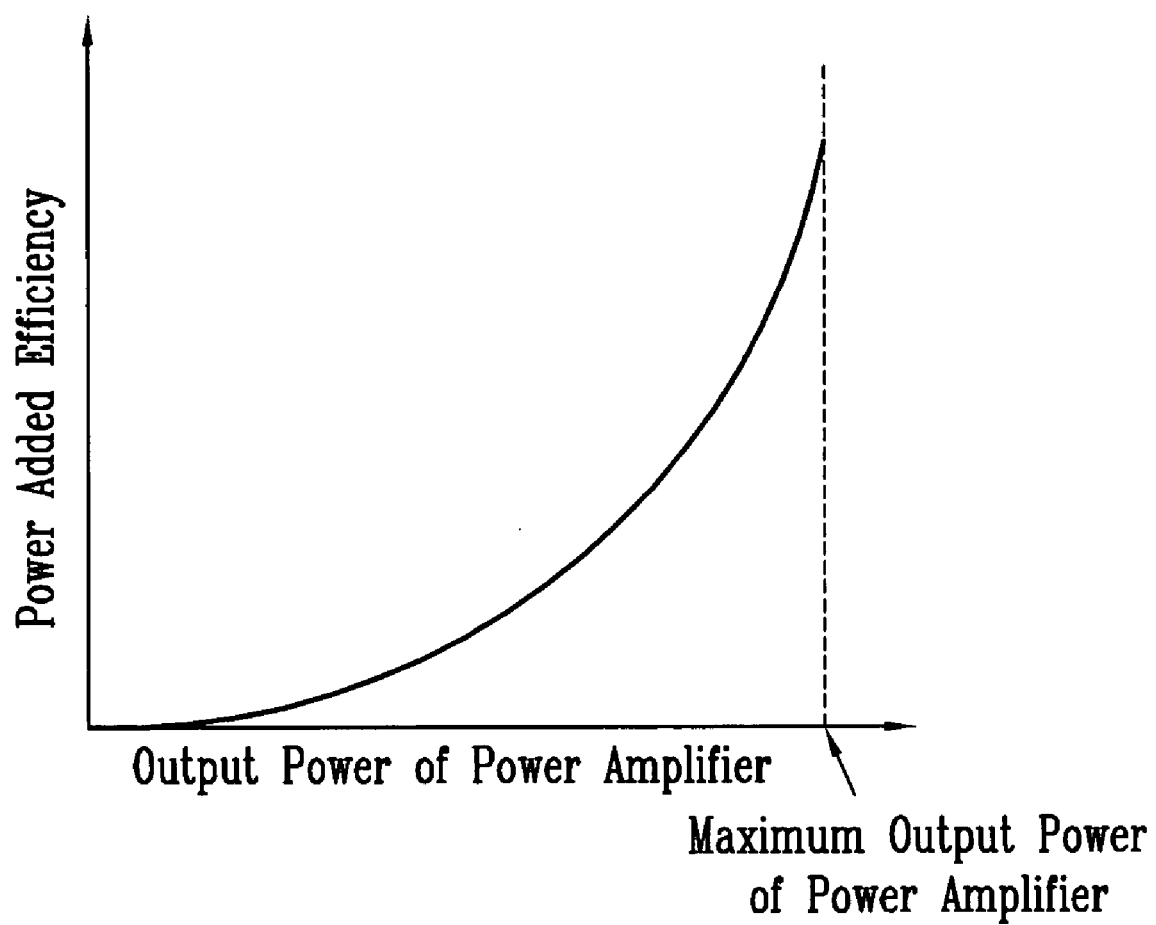
FIG. 2 is a diagram illustrating power added efficiency according to the output power of a power amplifier.
Figure 3:
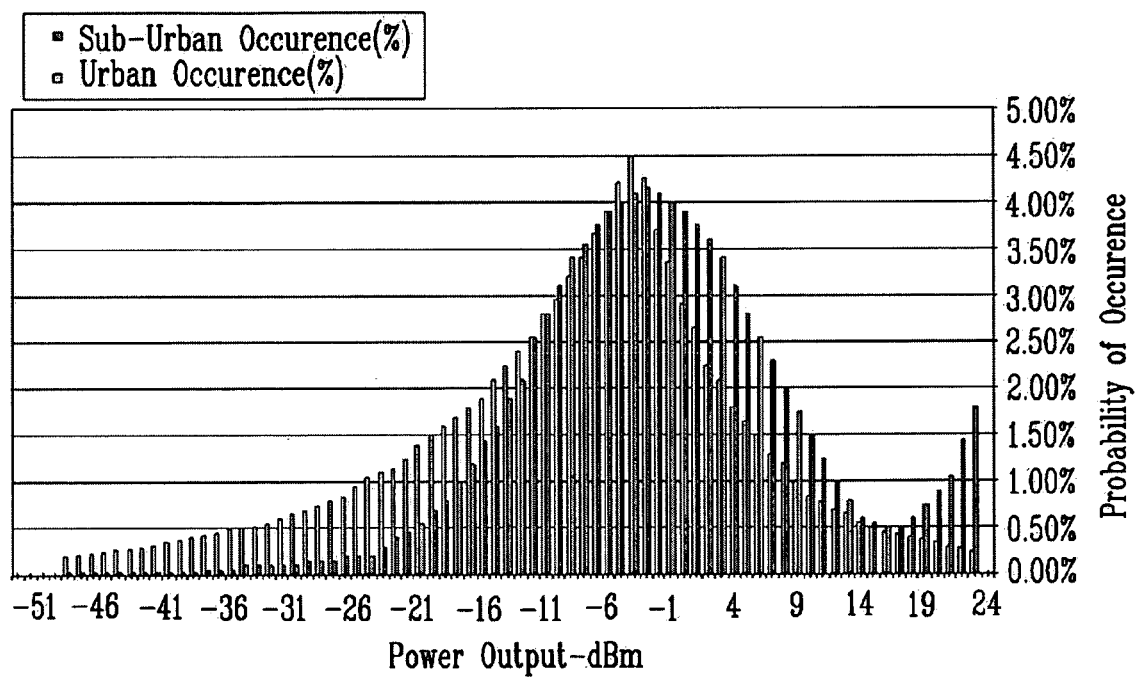
FIG. 3 is a distribution profile of occurrence probability depending on the output power of a transmitting system of a cellular-band mobile communication terminal.
Figure 4:
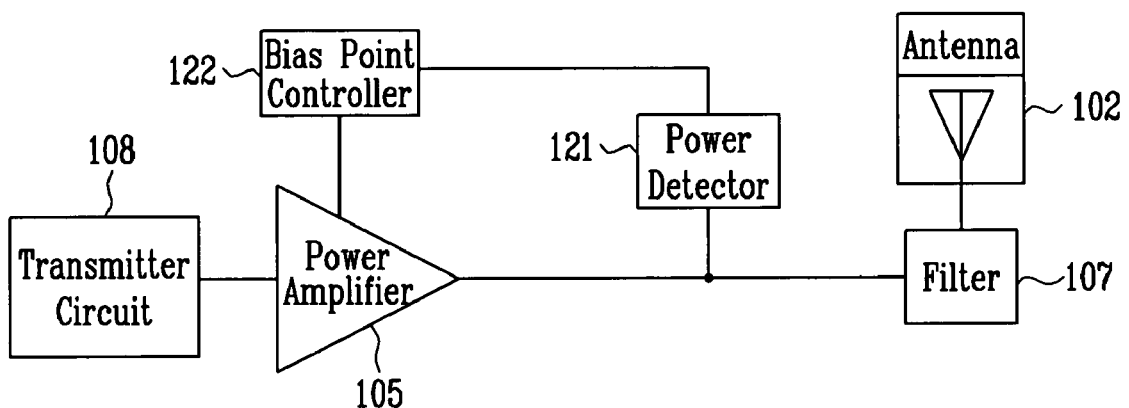
FIG. 4 is a block diagram illustrating a configuration of a transmitting unit employing a DC bias point control, which is one of methods for improving the power amplifier efficiency according to the prior art.

Compared with the DC bias point control, which is one of methods for improving the efficiency of the power amplifier according to the prior art illustrated in FIG. 4, the present invention has a merit that the amount of DC bias current inputted to the power amplifier remains constant when the power amplifier is operated, whereby the output matching condition remains constant, and thus, not aggravating the linearity, although the DC bias point control has a problem in aggravating the linearity due to the change of the output matching condition of the power amplifier according to the bias point change.

Figure 5:
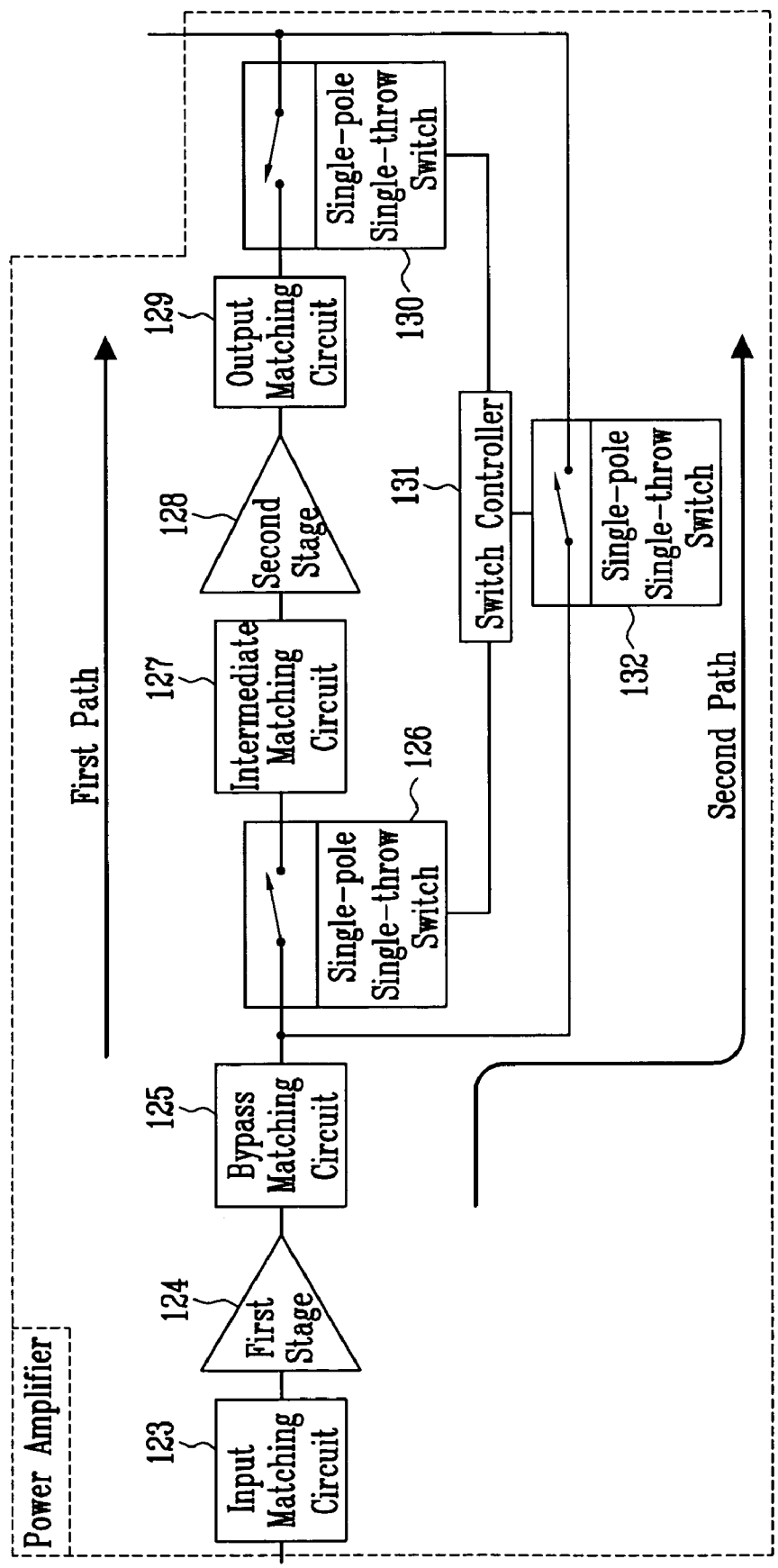
FIG. 5 is a block diagram illustrating a configuration of a power amplifier employing a second stage by-pass, which is one of methods for improving the power amplifier efficiency according to the prior art.

Further, the second stage by-pass, which is one of methods for improving the efficiency of the power amplifier according to the prior art illustrated in FIG. 5, employs three single-pole single-throw by-pass switches and requires an bypass matching circuit in addition to the existing matching circuit. As a result, the structure of the power amplifier is complicated. However, the present invention isolates only one path by two single-pole single-throw by-pass switches 111 and 112 since the other path is isolated by the first antenna 101 and the second antenna 102 of the dual antenna, when isolating the first path and the second path. Further, in case where the output signal of the transmitter circuit 108 is switched to the second path, an additional bypass matching circuit is not required since the input of the filter 106 of the first antenna and the output of the transmitter circuit 108 have the same impedance condition. In addition, the second stage by-pass cannot be applied to the existing power amplifier consisting of a first stage and a second stage, and input/output/intermediate matching circuits since the bypass structure should be considered from when designing the power amplifier. However, the present methods can be applied even to the existing power amplifier since the bypass path and the switches can be externally installed.

The dual antenna diversity transmitter and system according to the present invention have a simple configuration that adds a switch to the dual antenna diversity transmitter and system according to the prior art, in which the power amplifier turns to an idle state for some period during operation, thus having a merit that the power amplifier can be operated more efficiently.

Further, in the dual antenna diversity transmitter and system according to the present invention, the transmitter and the system is operated with even less power when the amount of power is limited as the mobile terminal. Therefore, it has a merit that the operation time of the transmitter and the system can be increased.

While the subject matter of the present invention has been specifically described along with the preferred embodiments, it should be noted that the above embodiments are for illustration, not for limitation. Further, those skilled in the art will appreciate that a variety of modification can be made within the scope of the present invention.

The present application contains subject matter related to korean patent application no. 2003-97047, filed in the Korean Patent Office on Dec. 26, 2003, the entire contents of which being incorporated herein by reference.

What is claimed is:

1. A dual antenna diversity transmitter, comprising:
    a base-band process circuit for processing a base-band signal to output a base-band transmitting signal;
    a transmitter circuit for converting the base-band transmitting signal to a radio frequency transmitting signal;
    a first bypass switch opened or closed by means of a switch control signal, and receiving the radio frequency transmitting signal;
    a first antenna receiving an output of the first bypass switch;
    a second bypass switch opened or closed by means of the switch control switch, and receiving the radio frequency transmitting signal;
    a power amplifier amplifying and outputting an output of the second switch; and
    a second antenna receiving an output of the power amplifier.

2. The dual antenna diversity transmitter according to claim 1, wherein the switch control signal is outputted from the base-band process circuit.

3. The dual antenna diversity transmitter according to claim 1, wherein:
    the switch control signal is set so that the first bypass switch is opened and the second bypass switch is closed, in case where required transmitting output power is larger than a predetermined threshold power; and
    the switch control signal is set so that the first bypass switch is closed and the second bypass switch is opened, in case where the required transmitting output power is smaller than the threshold power.

4. The dual antenna diversity transmitter according to claim 3, wherein the threshold power is a maximum output power of the radio frequency transmitter circuit.

5. The dual antenna diversity transmitter according to claim 3, wherein:
    the power amplifier performs amplification when the required transmitting output power is larger than the threshold power, and
    the power amplifier does not perform the amplification when the required transmitting output power is smaller than the threshold power.

6. The dual antenna diversity transmitter according to claim 5, wherein the threshold power is a maximum output power of the radio frequency transmitter circuit.

7. The dual antenna diversity transmitter according to claim 1, wherein the transmitter circuit includes an amplifier having amplification capability lower than that of the power amplifier.

8. The dual antenna diversity transmitter according to claim 1, further comprising:
    a first filter removing an unnecessary signal from the output signal of the first bypass switch to input to the first antenna; and
    a second filter removing an unnecessary signal from the output signal of the power amplifier to input a resultant signal to the second antenna.

9. A dual antenna diversity system comprising a first antenna, a second antenna, a first diversity switch, a second diversity switch, a power amplifier, a first filter, a second filter, a transmitter circuit, a receiver circuit, a base-band process circuit, a first bypass switch, and a second bypass switch, wherein:
    the transmitter circuit converts a base-band transmitting signal outputted from the base-band process circuit into a radio frequency transmitting signal;
    the first bypass switch is opened or closed depending on a switch control signal, and when closed, outputs the radio frequency transmitting signal to the first filter;
    the second bypass switch is opened or closed depending on the switch control signal, and when closed, outputs the radio frequency transmitting signal to the power amplifier;
    the power amplifier amplifies and outputs an output of the second bypass switch;
    the receiver circuit converts an inputted radio frequency receiving signal into a base-band receiving signal to output to the base-band process circuit;
    the first diversity switch connects an input of the receiver circuit to the first filter or one terminal of the second diversity switch, depending on the switch control signal;
    the second diversity switch connects the second filter to the output of the power amplifier or one terminal of the first diversity switch, depending on the switch control signal;
    the first antenna is connected to the first filter; and
    the second antenna is connected to the second filter.

10. The dual antenna diversity system according to claim 9, wherein the transmitter circuit includes an amplifier having amplification capability lower than that of the power amplifier.

11. The dual antenna diversity system according to claim 9, wherein:
    the switch control signal is set so that the first bypass switch is opened and the second bypass switch is closed, in case where required transmitting output power is larger than maximum output power of the radio frequency transmitter circuit; and
    the switch control signal is set so that the first bypass switch is closed and the second bypass switch is opened, in case where the required transmitting output power is smaller than the maximum output power of the radio frequency transmitter circuit.

12. The dual antenna diversity system according to claim 11, wherein the transmitter circuit includes an amplifier having amplification capability lower than that of the power amplifier.

13. The dual antenna diversity system according to claim 9, wherein:
- the power amplifier performs amplification, when required transmitting output power is larger than maximum output power of the radio frequency transmitter circuit; and
- the power amplifier does not perform the amplification, when the required transmitting output power is smaller than the maximum output power of the radio frequency transmitter circuit.

14. The dual antenna diversity system according to claim 13, wherein the transmitter circuit includes an amplifier having amplification capability lower than that of the power amplifier.

15. A dual antenna diversity system comprising first and second antennas, a diversity switch, a power amplifier, a transmitter circuit, a receiver circuit, a base-band process circuit, a first bypass switch, a second bypass switch, a first duplex, and a second duplex, wherein:
- the transmitter circuit converts a base-band transmitting signal outputted from the base-band process circuit into a radio frequency transmitting signal;
- the first bypass switch is opened or closed depending on the switch control signal, and outputs the radio frequency transmitting signal to the first duplex, when closed;
- the second bypass switch is opened or closed depending on the switch control signal, and outputs the radio frequency transmitting signal to the power amplifier, when closed;
- the power amplifier amplifies and outputs an output of the second bypass switch;
- the receiver circuit converts an inputted radio frequency receiving signal into a base-band receiving signal to output to the base-band process circuit;
- the diversity switch connects an input of the receiver circuit to the first duplex or the second duplex, depending on the switch control signal;
- the first duplex transfers a signal received from the first antenna to the diversity switch, and transfers a signal inputted from the first bypass switch to the first antenna; and
- the second duplex transfers a signal received from the second antenna to the diversity switch, and transfers a signal inputted from the power amplifier to the second antenna.

16. The dual antenna diversity system according to claim 15, wherein the transmitter circuit includes an amplifier having amplification capability lower than that of the power amplifier.

17. The dual antenna diversity system according to claim 15, wherein:
- the switch control signal is set so that the first bypass switch is opened and the second bypass switch is closed, in case where required transmitting output power is larger than maximum output power of the radio frequency transmitter circuit; and
- the switch control signal is set so that the first bypass switch is closed and the second bypass switch is opened, in case where the required transmitting output power is smaller than the maximum output power of the radio frequency transmitter circuit.

18. The dual antenna diversity system according to claim 17, wherein the transmitter circuit includes an amplifier having amplification capability lower than that of the power amplifier.

19. The dual antenna diversity system according to claim 15, wherein:
- the power amplifier performs amplification when required transmitting output power is larger than maximum output power of the radio frequency transmitter circuit; and
- the power amplifier does not perform the amplification when the required transmitting output power is smaller than the maximum output power of the radio frequency transmitter circuit.

20. The dual antenna diversity system according to claim 19, wherein the transmitter circuit includes an amplifier having amplification capability lower than that of the power amplifier.

* * * * *